(12) United States Patent
Kim

(10) Patent No.: US 11,752,938 B2
(45) Date of Patent: Sep. 12, 2023

(54) APPARATUS AND METHOD FOR DETERMINING STATE OF DRIVER

(71) Applicants: HYUNDAI MOTOR COMPANY, Seoul (KR); KIA CORPORATION, Seoul (KR)

(72) Inventor: Dae Young Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 237 days.

(21) Appl. No.: 17/365,564

(22) Filed: Jul. 1, 2021

(65) Prior Publication Data

US 2022/0194294 A1 Jun. 23, 2022

(30) Foreign Application Priority Data

Dec. 21, 2020 (KR) .................. 10-2020-0180234

(51) Int. Cl.
*B60Q 9/00* (2006.01)
*B62D 1/04* (2006.01)

(52) U.S. Cl.
CPC ............... *B60Q 9/00* (2013.01); *B62D 1/046* (2013.01)

(58) Field of Classification Search
CPC . B60Q 9/00; B62D 1/046; B62D 1/06; B62D 15/025; B60W 40/09; B60W 50/16; B60W 10/20; B60W 40/08; B60W 2510/202; G06F 3/0414; G06F 3/044
See application file for complete search history.

(56) References Cited

U.S. PATENT DOCUMENTS

| | | | |
|---|---|---|---|
| 9,475,521 B1 | 10/2016 | Fung et al. | |
| 10,160,484 B2 | 12/2018 | Lee et al. | |
| 11,188,074 B1* | 11/2021 | Benavidez | ........... G05D 1/0044 |
| 2015/0217687 A1* | 8/2015 | Colvin, Sr. | ............ G08B 21/06 |
| | | | 180/272 |
| 2016/0132054 A1 | 5/2016 | Eigel | |
| 2018/0326992 A1* | 11/2018 | Aoi | ...................... G06V 40/107 |
| 2019/0300014 A1 | 10/2019 | Nagase et al. | |
| 2020/0017141 A1 | 1/2020 | Moreillon et al. | |

(Continued)

FOREIGN PATENT DOCUMENTS

| | | |
|---|---|---|
| DE | 102011002401 A1 | 7/2012 |
| EP | 1934083 A1 | 6/2008 |

(Continued)

OTHER PUBLICATIONS

European Search Report cited in European patent application No. 21182735.7; dated Jan. 18, 2022; 10 pp.

*Primary Examiner* — Omeed Alizada
(74) *Attorney, Agent, or Firm* — LEMPIA SUMMERFIELD KATZ LLC

(57) ABSTRACT

A driver state determining method may include: obtaining a touch sensing value corresponding to a touch input by a driver of a vehicle, and a steering torque sensing value corresponding to a steering torque input from the driver; determining a state of the driver as one of a hand-off state, a normal grip state, an abnormal grip state, or a hand-off determination pending state based on at least one of the touch sensing value or the steering torque sensing value, and outputting a guide message according to the determination result.

19 Claims, 22 Drawing Sheets

(56) References Cited

U.S. PATENT DOCUMENTS

| | | |
|---|---|---|
| 2020/0189655 A1 | 6/2020 | Ahn et al. |
| 2020/0269902 A1 | 8/2020 | Heitzer |
| 2021/0269089 A1* | 9/2021 | Kuenzner ............ B62D 15/025 |

FOREIGN PATENT DOCUMENTS

| | | |
|---|---|---|
| EP | 3594090 A1 | 1/2020 |
| JP | 2018001907 A | 1/2018 |
| JP | 2018052379 A | 4/2018 |
| WO | 2007031619 A1 | 3/2007 |

* cited by examiner

APPARATUS AND METHOD FOR DETERMINING STATE OF DRIVER

CROSS-REFERENCE TO RELATED APPLICATION

This application claims priority to and the benefit of Korean Patent Application No. 10-2020-0180234, filed on Dec. 21, 2020, the entire contests of which are incorporated herein reference.

FIELD

The present disclosure relates to an apparatus for determining a driver's state, and a method thereof.

BACKGROUND

The statements in this section merely provide background information related to the present disclosure and may not constitute prior art.

A driving assistance device of a vehicle performs a function that assists the driving of the vehicle, such as keeping a lane, keeping a distance between vehicles, keeping a speed, or the like. To monitor driver's intent or attention, the driving assistance device may general determine whether the driver's hand(s) is placed on a steering wheel. Besides, to transfer a driving control right to the driver in a specific situation, an autonomous driving device of the vehicle may determine whether the driver has his or her hand(s) positioned on the steering wheel (referred to as a hands on state).

Generally, the hands on state is determined using a torque sensor or a contact sensor (an electrostatic sensor or a pressure-sensitive sensor). However, we have discovered that when the driver intentionally places a heavy object on the steering wheel or when an capable of generating an electric field contacts the contact sensor on the steering wheel, it may be incorrectly determined that the driver's hands are positioned on the steering wheel.

SUMMARY

The present disclosure has been made to solve the above-mentioned problems occurring in the prior art while advantages achieved by the prior art are maintained intact.

An aspect of the present disclosure provides a driver state determination apparatus capable of correctly determining whether the driver's hand(s) is positioned on a steer wheel, even when the driver tries to cause a vehicle to incorrectly determine that the driver's hand(s) is positioned on the steering wheel.

The technical problems to be solved by the present inventive concept are not limited to the aforementioned problems, and any other technical problems not mentioned herein will be clearly understood from the following description by those skilled in art to which the present disclosure pertains.

According an aspect of the present disclosure, a driver state determining method may include: obtaining, at least one sensor, a touch sensing value corresponding to a touch input by a driver of a vehicle, and a steering torque sensing value corresponding to a steering torque input from the driver; and determining a state of the driver as one of a rand-off state, a normal grip state, an abnormal grip state, or a hand-off determination pending state based on at least one of the touch sensing value or the steering torque sensing value.

The determining of the state of the driver may include determining the state of the driver as the hand-off state when the touch sensing value is less than a predetermined value or when variance of the touch sensing value is within a predetermined range.

The determining of the state of the driver may include determining that the state of the driver is changed from the hand-off state to the normal grip state when a state before determination of the hand-off state is the abnormal grip state, a normal grip determination condition is satisfied, and a deviation of the touch sensing value is different from the deviation of the touch sensing value in the abnormal grip state by a predetermined value or more.

The normal grip determination condition may include a case that the touch sensing value is not less than a predetermined value or a variance of the touch sensing value is out of a predetermined range.

The determining of the state of the driver may include determining that the state of the driver is changed from the normal grip state to the abnormal grip state when the deviation of the touch sensing value in the normal grip state is less than a reference value.

The determining of the state of the driver may include determining the state of the driver as the hand-off determination pending state when a deviation of the touch sensing value in the hand-off state is not less than a reference value.

The determining of the state of the driver may include determining the state of the driver as the hand-off state when each of the touch sensing value and the steering torque sensing value are less than a predetermined value or both a variance of the touch sensing value and a variance of the steering torque sensing value are within a predetermined range.

The determining of the state of the driver may include determining that the state of the driver is changed from the hand-off state to the normal grip state when a state before determination of the hand-off state is the abnormal grip state based on the touch sensing value, a normal grip determination condition based on the touch sensing value or the steering torque sensing value is satisfied, and a deviation of the touch sensing value is different from the deviation of the touch sensing value in an abnormal grip state by a predetermined value or more.

The determining of the state of the driver may include determining that the state of the driver is changed from the hand-off state to the normal grip state when the state before determination of the hand-off state is the abnormal grip state based on the steering torque sensing value, the normal grip determination condition based on the touch sensing value or the steering torque sensing value alt satisfied, and a deviation of the steering torque sensing value is not less than a reference value.

The normal grip determination condition based on the touch sensing value or the steering torque sensing value may include a case that the touch sensing value or the steering torque sensing value is not less than a predetermined value or a variance of the touch sensing value or a variance of the steering torque sensing value is out of a predetermined range.

The determining of the state of the driver may include determining that the state of the driver is changed from the normal state to the abnormal grip state when a deviation of the touch sensing value is less than a reference value in the normal grip state based on the touch sensing value or the steering torque sensing value is less than a reference value in the normal grip state based on the steering torque sensing value.

The determining of the state of the driver may include determining the state of the driver as the hand-off determination pending state when a deviation of the touch sensing value or a deviation of the steering torque sensing value is not less than a reference value in the hand-off state.

The method may further include outputting a guide message according to the determination result after determining the state of the driver.

The outputting of the guide message may include outputting a hand-off message in one or more of the hand-off state and the abnormal grip state.

The outputting of the guide message may include differently setting an output start point of the hand-off message when it is determined that the state of the driver is changed from the normal grip state to the hand-off state and it is determined that the state of the driver is changed from the abnormal grip state to the hand-off state.

The outputting of the guide message may include outputting a different hand-off message when it is determined that the state of the driver is changed from the normal grip state to the hand-off state and it is determined that the state of the driver is changed from the abnormal-grip state to the hand-off state.

The outputting of the guide message may include differently setting a sound of the hand-off message output in the hand-off state and a sound of the hand-off message output in the abnormal grip state.

The touch sensing value according to the touch of the driver may be obtained by a touch sensor including at least one of an electrostatic sensor or a pressure-sensitive sensor.

According to an aspect of the present disclosure, a driver state determination apparatus may include: a touch sensor that detects a touch input by a driver of a vehicle and generates a touch sensing value corresponding to the touch input; a steering torque sensor that measures a steering torque input from the driver and generates a steering, torque sensing value corresponding to the measured steering torque; and a controller determining state of the driver as at least one of a hand off state, a normal grip state, an abnormal grip state, hand off determination pending state based on at east one of the touch sensing value or the steering torque sensing value.

The touch sensor may ode at least one of an electrostatic sensor or a pressure-sensitive sensor.

Further areas of applicability will become apparent from the description provided herein. It should be understood that the description and specific examples are intended for purposes illustration only and are not intended to limit scope of the present disclosure.

DRAWINGS

In order that the disclosure may be well understood, there will now be described various forms thereof, given by way of example, reference being made to the accompanying drawings, in which:

FIG. is a block diagram illustrating a configuration of a driver state determination apparatus according to an exemplary form of the present disclosure;

Figure 1:
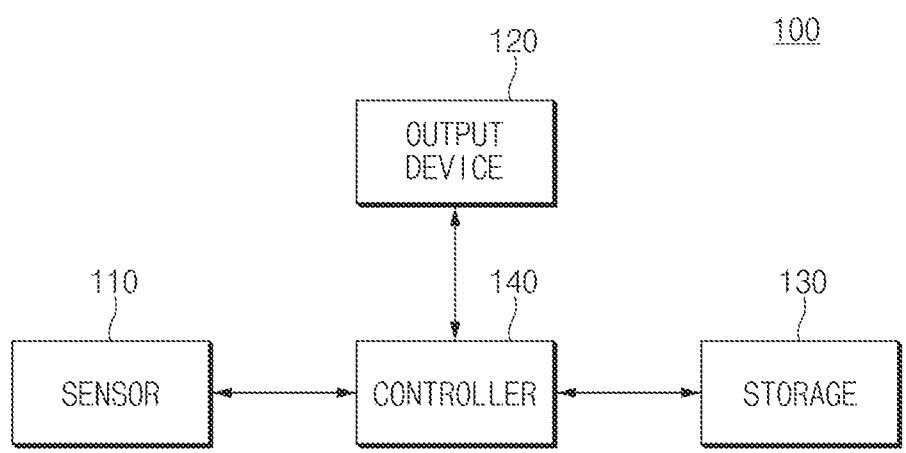

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the forms of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a driver state determination apparatus according to an exemplary form of the present disclosure.

As illustrated in FIG. 1, a driver state determination apparatus 100 may include a sensor 110, an output device 120, storage 130, and a controller 140.

The sensor 110 may detect a touch input by driver of a vehicle and generate a touch sensing value corresponding to the touch input (e.g., a driver's touch on a steering wheel), and measure a steering torque input from the driver and generate a steering torque sensing value corresponding to the measured steering torque. Herein, the touch sensing value may refer to a value for the degree of contact (touch) obtained through an operation in which the driver touches or grips the steering wheel. The sensor 110 that obtains the touch sensing value may include a touch sensor. According to one form of the present disclosure, the touch sensor may include at least one of an electrostatic sensor or a pressure-sensitive sensor. The electrostatic sensor may obtain a touch sensing value based on an impedance (resistance) value that varies depending on a distance from a steering wheel or a contact area with the steering wheel. The pressure-sensitive sensor may obtain a touch sensing value based on an impedance (resistance) value that varies depending on the intensity of a touch pressure. Furthermore, the steering torque of the driver may be obtained through an operation in which the driver rotates a steering wheel while holding the steering wheel. The sensor 110 that obtains a steering torque sensing value may include a steering torque sensor.

The output device 120 may include a visual output device and an audible output device. According to an form of the present disclosure, the visual output device may include an apparatus that visually outputs a guide message according to the determination result of the controller 140, and may include, for example a cluster display device, an audio video navigation (AVN) display device, and a head up display (HUD). The audible output device may include a device that audibly outputs a guide message according to a determination result of the controller 140, and may include, for example, a speaker.

The storage 130 may store at least one algorithm (e.g., a set of instructions) for performing calculation or execution of various commands for an operation of the driver state determination apparatus according to some forms of the present disclosure. The storage 130 may include at least one storage medium of a flash memory, a hard disk, a memory card, a read-only memory (ROM), a random access memory (RAM), an electrically erasable programmable read only memory (EEPROM), a programmable read-only memory (PROM), a magnetic memory, a magnetic disk, or an optical disc.

The controller 140 may be implemented by various processing devices such as a microprocessor equipped with a semiconductor chip capable of performing or executing various commands, and may control an operation of the driver state determination apparatus according to some forms of the present disclosure. In detail, the controller 140 may determine that the state of the driver is at least one of a hand-off state, a normal grip state, an abnormal grip state, or a hand-off determination pending state, based on at least one of a touch sensing value or a steering torque sensing value that are obtained from the sensor 110.

According to another form of the present disclosure, the controller 140 may determine the state of the driver based on the touch sensing value, and may determine toe state of the driver based on the touch sensing value or the steering torque sensing value.

Hereinafter, an operation of the controller 140 that determines the state of a driver based on a touch sensing value according to another form of the present disclosure will be described with reference to FIGS. 2 to 13.

FIGS. 2 to 7 are diagrams illustrating an operation of determining a hand-off state, a normal grip state, or an abnormal grip state according to some forms of the present disclosure. FIGS. 8 to 13 are diagrams illustrating an operation of determining a hand-off state, a hand-off determination pending state, and a hand-on state according to some forms of the present disclosure.

Figure 2:
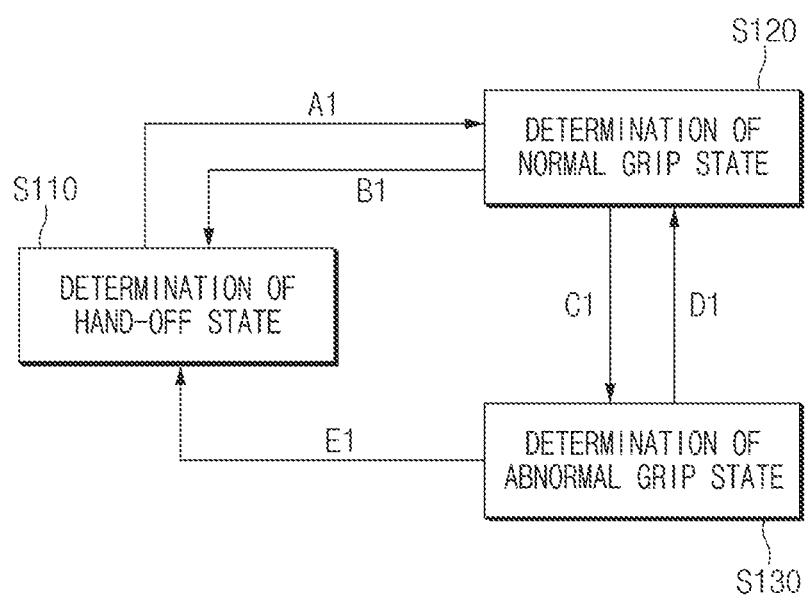
FIGS. 2 to 7 are diagrams illustrating an operation of determining a hand-off state, a normal grip state, or an abnormal grip state according to some forms of the present disclosure.

As illustrated in FIG. 2, the controller 140 may determine a hand-off state based on a touch sensing value (S110). In S110, when the touch sensing value is less than a predetermined first value or when a variance in the touch sensing value is within a predetermined first range, the controller 140 may determine that the state of the driver is a hand-off state. Besides, the controller 140 may determine that a state of a driver is changed from the hand-off state to a normal grip state, based on the touch sensing value (S120). Alternatively, the controller 140 may determine that the state of the driver is changed from the normal grip state to an abnormal grip state (S130).

In more detail, when condition A1 is satisfied, the controller 140 may determine that the state of the driver is changed from the hand-off state to the normal grip state (S120). The more detailed description is given with reference to FIG. 3.

Figure 3:
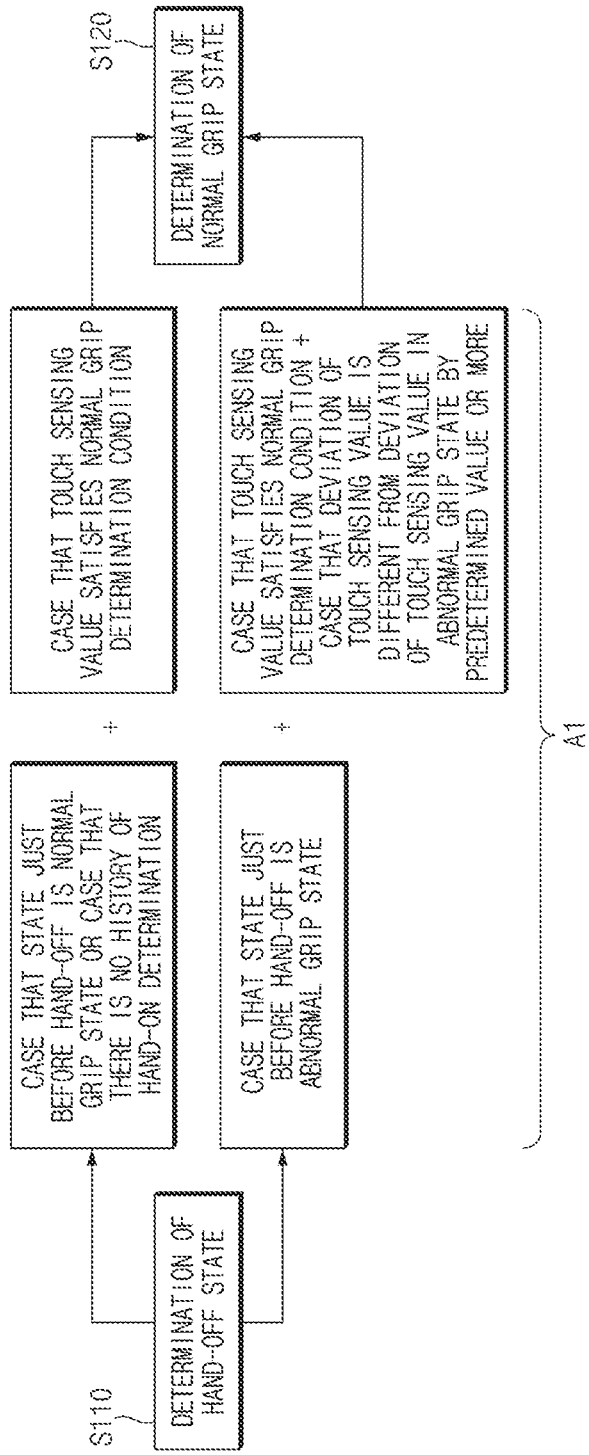

As illustrated in FIG. 3, when determining that a state just before hand-off is a normal grip state or that there is no history of hand-on determination and when the touch sensing value satisfies a normal grip determination condition, the controller 140 may determine that the state of the driver is changed from a hand-off state to a normal grip state (S120). Alternatively, when a state just before hand-off is an abnormal grip state, when the touch sensing value satisfies the normal grip determination condition, and when a deviation of the touch sensing value is different from a deviation of the touch sensing value obtained in the abnormal grip state by a predetermined value or more, the controller 140 may determine that the state of the driver is changed from a hand-off state to a normal grip state (S120). Herein, the normal grip determination condition may include a case that a touch sensing value is not less than a second value greater than a predetermined first value, or a case that a variance of the touch sensing value is out of a second range greater than a predetermined first range.

Also, when condition B1 is satisfied in FIG. 2, the controller 140 may determine that the state of the driver is changed from the normal grip state to a hand-off state (S110). The more detailed description is given with reference to FIG. 4.

Figure 4:
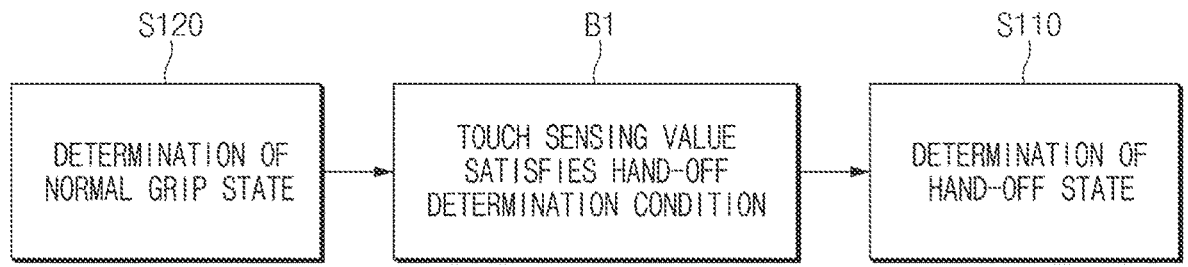

As illustrated in FIG. 4, when a touch sensing value in the normal grip state satisfies a hand-off determination condition (B1), the controller 140 may determine that the state of the driver is changed from the normal drip state to a hand-off state (S110). Herein, the hand-off determination condition (B1) may include a case that a touch sensing value is less than the predetermined value, or a case that a variance of the touch sensing value is within a predetermined range.

Furthermore, when condition C1 is satisfied in FIG. 2, the controller 140 may determine that the state of the driver is changed from the normal grip state to the abnormal grip state (S130). The more detailed description is given with reference to FIG. 5.

Figure 5:
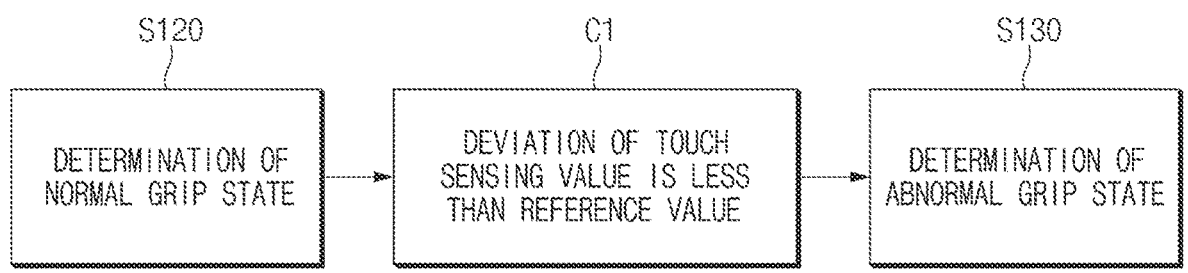

As illustrated in FIG. 5, when a deviation of the touch sensing value in the normal grip state is less than a reference value, the controller 140 may determine the state of the driver is changed from the normal grip state to the abnormal grip state (S130). Herein, the controller 140 may calculate a deviation of the touch sensing value within a time window of a predefined specific time.

Furthermore, when condition D1 is satisfied in FIG. 2, the controller 140 may determine that the state of the driver is changed from the abnormal grip state to the normal grip state (S120). The more detailed description is given with reference to FIG. 6.

Figure 6:
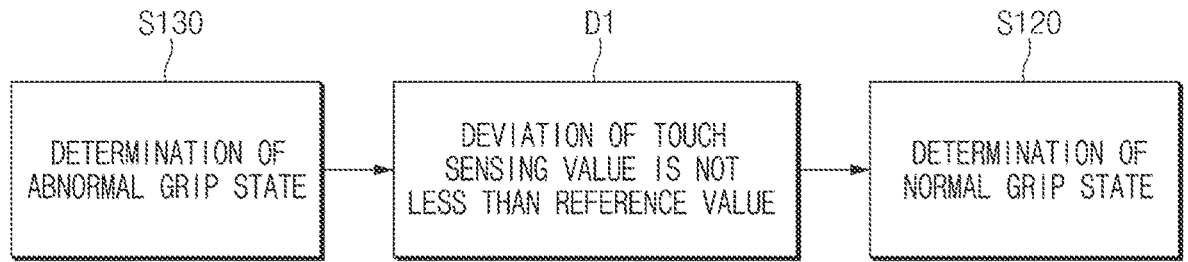

As illustrated in FIG. 6, when determining that a deviation of the touch sensing value in the abnormal grip state is not less than the reference value, the controller 140 may determine the state of the driver is changed from the abnormal grip state to the normal grip state (S120).

Furthermore, when condition E1 is satisfied in FIG. 2, the controller 140 may determine that the state of the driver is changed from the abnormal grip state to the hand-off state (S110). The more detailed description is given with reference to FIG. 7.

Figure 7:
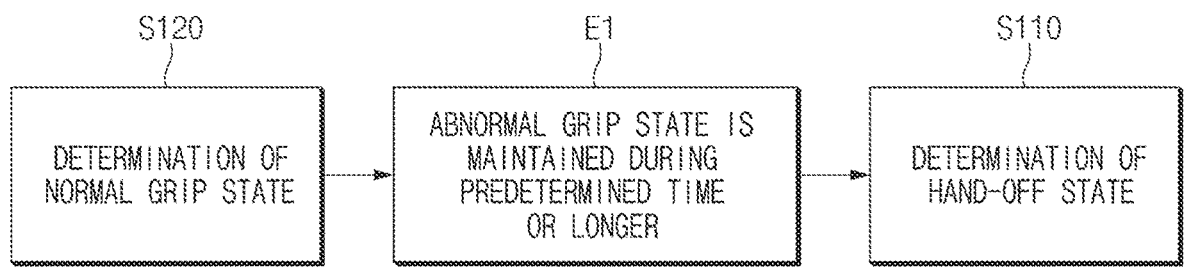

As illustrated in FIG. 7, when determining that the abnormal grip state is maintained in the abnormal grip state during a predetermined time or longer, the controller 140 may determine that the state of the driver is changed from an abnormal grip state to the hand-off state (S110). Herein, the abnormal grip state may include a state where a deviation of the touch sensing value is less than a reference value.

Figure 8:
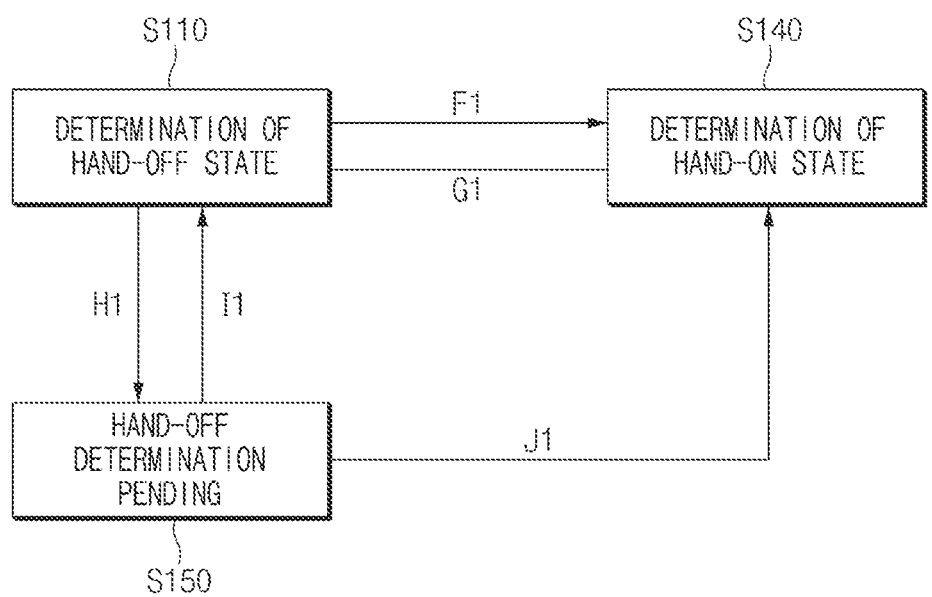
FIGS. 8 to 13 are diagrams illustrating an operation of determining a hand-off state, a hand-off determination pending state, and a hand-on state according to some forms of the present disclosure.

As illustrated in FIG. 8, the controller 140 may determine a hand-off state based on a touch sensing value (S110). Also, on the basis of the touch sensing value, the controller 140 may determine that the state of the driver is changed from the hand-off state to a hand-on state (S140) or may determine that the state of the driver is changed from the hand-off state to a hand-off determination pending state (S150).

When condition F1 is satisfied in the hand-off state in FIG. 8, the controller 140 may determine that the state of the driver is changed from the hand-off state to the hand-on state (S140). The more detailed description is given with reference to FIG. 9.

Figure 9:
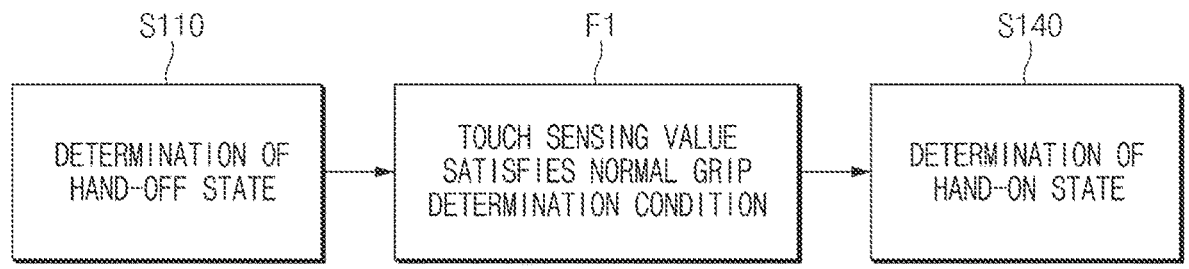

As illustrated in FIG. 9, when the touch sensing value satisfies the normal grip determination condition in the hand-off state, the controller 140 may determine that the state of the driver is the hand-on state (S140). Herein, the normal grip determination condition may include a case that a touch sensing value is not less than a second value greater than a predetermined first value, or a case that a variance of the touch sensing value is out of a second range greater than a predetermined first range.

When condition G1 is satisfied in the hand-off state in FIG. 8, the controller 140 may determine that the state of the driver is changed from the hand-on state to the hand-off state (S110). The more detailed description is given with reference to FIG. 10.

Figure 10:
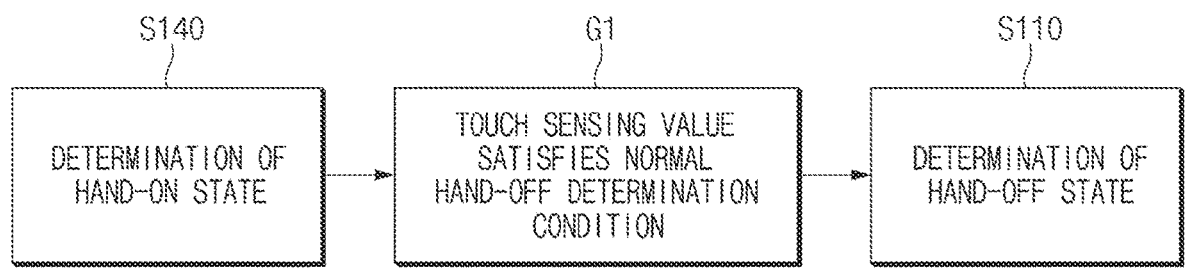

As illustrated in FIG. 10, when the touch sensing value satisfies the hand-off determination condition in the hand-on state, the controller 140 may determine that the state of the driver is a hand-off state (S110). Herein, the hand-off determination condition may include a case that a touch sensing value is less than the predetermined value, or a case that a variance of the touch sensing value is within a predetermined range.

When condition H1 is satisfied in the hand-off state in FIG. 8, the controller 140 may not continuously determine that the state of the driver is the hand-off state, but may determine that the state of the driver is a hand-off determination pending state (S150). The more detailed description is given with reference to FIG. 11.

Figure 11:
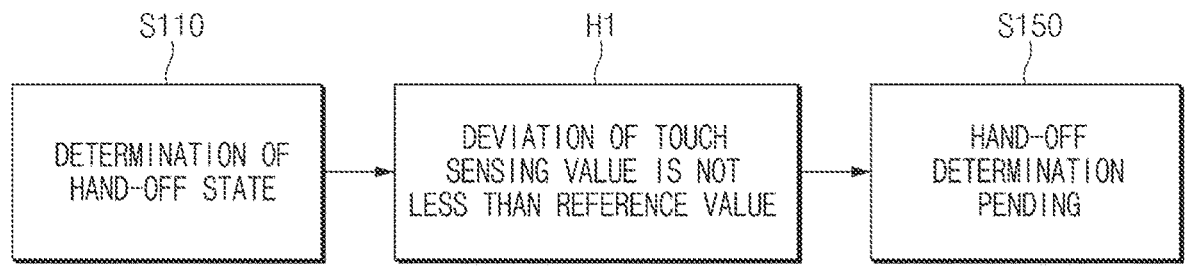

As illustrated in FIG. 11, when a deviation of the touch sensing value in the hand-off state is not less than a reference value, the controller 140 may determine that the state of the driver is changed from the hand-off state to the hand-off determination pending state (S150).

Furthermore, when condition I1 is satisfied in the hand-off determination pending state in FIG. 8, the controller 140 may determine that the state of the driver is the hand-off state (S110). The more detailed description is given with reference to FIG. 12.

Figure 12:
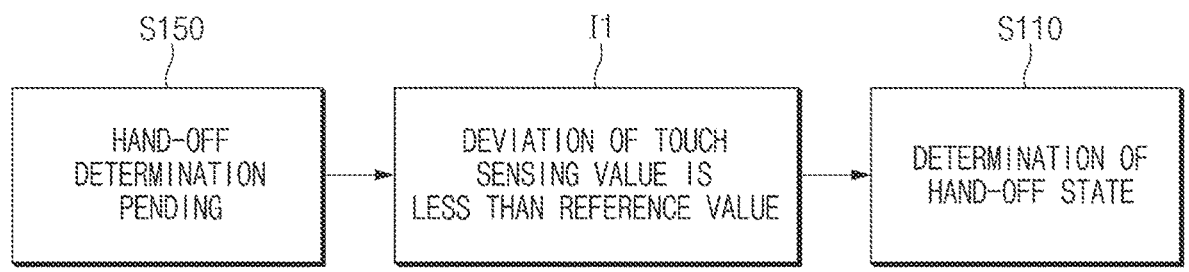

As illustrated in FIG. 12, when a deviation of the touch sensing value in the hand-off determination pending state is less than the reference value (I1), the controller 140 may determine that the state of the driver is changed from the hand-off determination pending state to the hand-off state (S110).

Furthermore, when condition J1 is satisfied in the hand-off determination pending state (S150) in FIG. 8, the controller 140 may determine that the state of the driver is the hand-on state (S140). The more detailed description is given with reference to FIG. 13.

Figure 13:
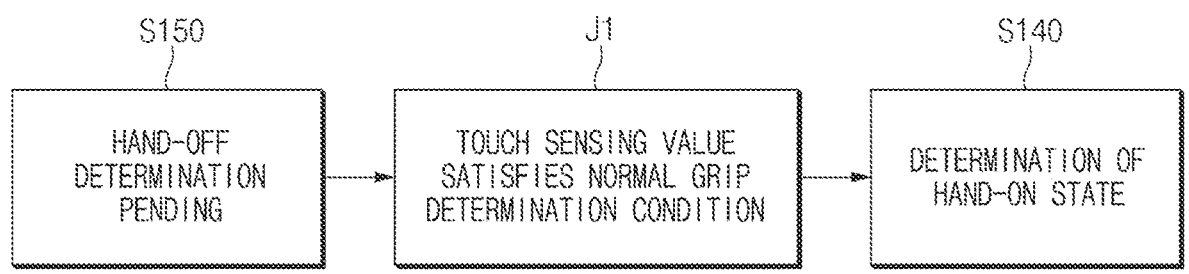

As illustrated in FIG. 13, when the touch sensing value satisfies the normal grip determination condition in the hand-off determination pending state, the controller 140 may determine that the state of the driver is changed from the hand-off determination pending state to the hand-on state (S140).

According to another form of the present disclosure, the controller 140 may determine the state of the driver based on at least one of the touch sensing value or the steering torque sensing value. Hereinafter, an operation of the controller 140 will be described with reference to FIGS. 14 to 25.

Figure 14:
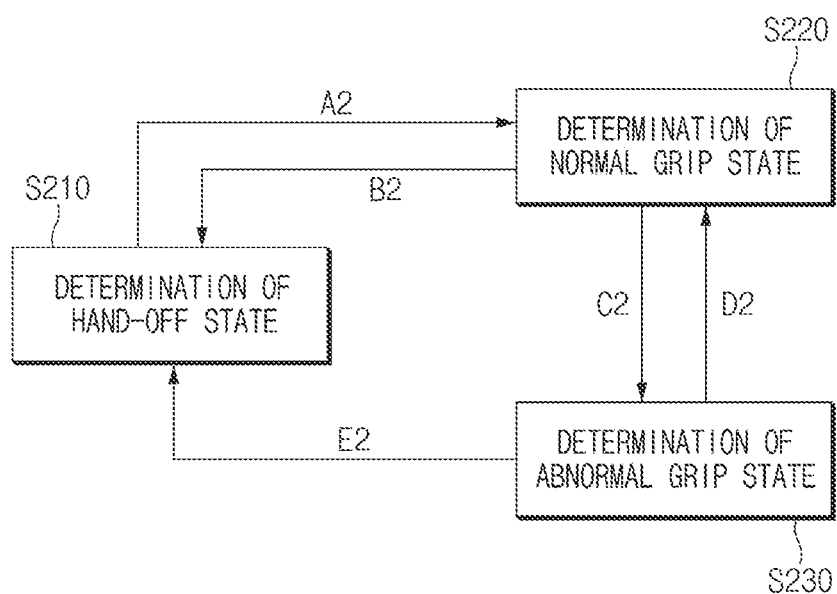
FIGS. 14 to 19 are diagrams illustrating an operation of determining a hand-off state, a normal grip state, or an abnormal grip state according to some forms of the present disclosure.

As illustrated in FIG. 14, the controller 140 may determine that the state of the driver is a hand-off state, based on at least one of a touch sensing value or a steering torque sensing value (S210). In S210, when the touch sensing value is less than a predetermined first value or a variance of the touch sensing value is within a predetermined first range and when a steering torque sensing value is less than a predetermined fifth value or a variance of the steering torque sensing value is within a predetermined fifth range, the controller 140 may determine that the state of the driver is a hand-off state. Besides, on the basis of at least one of a touch sensing value or a steering torque sensing value, the controller 140 may determine that a state of a driver is changed from the hand-off state to a normal grip state, based on the touch sensing value (S220), or may determine that the state of the driver is changed from the normal grip state to an abnormal grip state (S230).

In more detail, when condition A2 is satisfied in FIG. 14, the controller 140 may determine that the state of the driver is changed from the hand-off state to the normal grip state (S220). The more detailed description is given with reference to FIG. 15.

Figure 15:
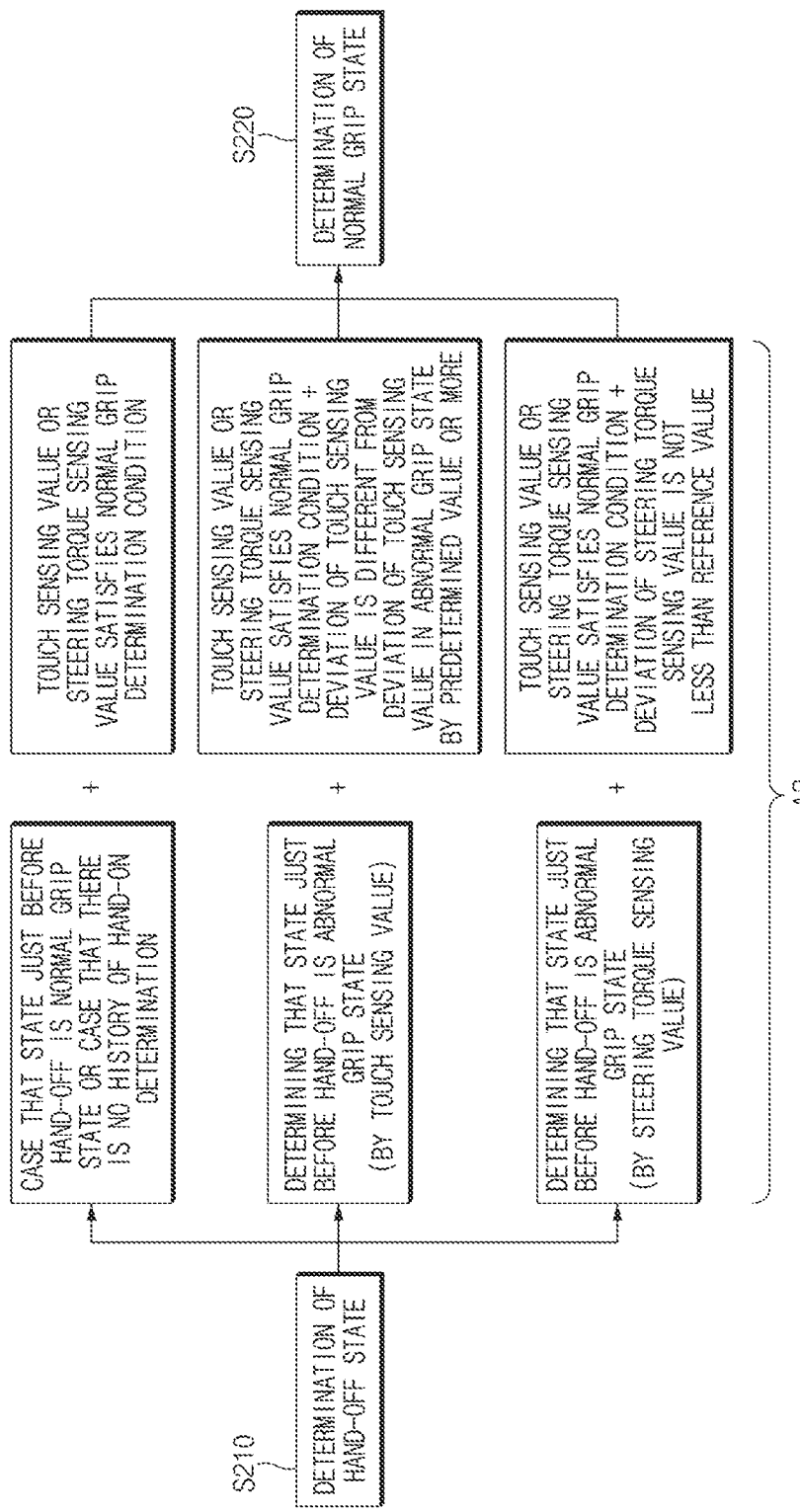

As illustrated in FIG. 15, when determining that a state just before hand-off is a normal grip state or that there is no history of hand-on determination and when determining that a touch sensing value or a steering torque sensing value satisfies a normal grip determination condition, the controller 140 may determine that the state of the driver is changed from a hand-off state to the normal grip state (S220). Alternatively, when the state just before hand-off is an abnormal grip state based on the touch sensing value, when the touch sensing value in the steering torque sensing value satisfies the normal grip determination condition, and when a deviation of the touch sensing value is different from a deviation of the touch sensing value obtained in the abnormal grip state by a predetermined value or more, the controller 140 may determine that the state of the driver is changed from a hand-off state to a normal grip state. Alternatively, when the state just before hand-off is an abnormal grip state based on the steering torque sensing value, when the touch sensing value or the steering torque sensing value satisfies the normal grip determination condition, and when a deviation of the steering torque sensing value is not less than a reference value, the controller 140 may determine that the state of the driver is changed from the hand-off state to the normal grip state (S220). Herein, the normal grip determination condition may include a case that a touch sensing value is not less than a second value greater than a predetermined first value, or a case that a variance of the touch sensing value is out of a second range greater than a predetermined first range. Furthermore, the normal grip determination condition may include a case that the steering torque sensing value is not less than a sixth value greater than a predetermined fifth value, or a case that a variance of the steering torque sensing value is out of a sixth range greater than a predetermined fifth range.

Furthermore, when condition B2 is satisfied in FIG. 14, the controller 140 may determine that the state of the driver is changed from the normal grip state to the hand-off state (S210). The more detailed description is given with reference to FIG. 16.

Figure 16:
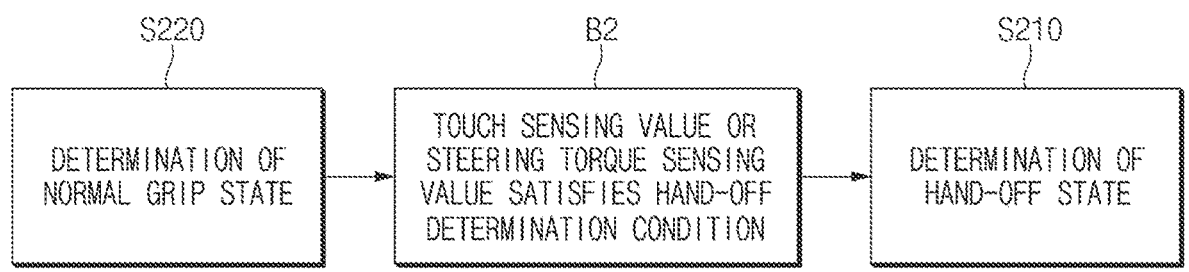

As illustrated in FIG. 16, when a touch sensing value or a steering torque sensing value satisfies a hand-off determination condition in the normal grip state, the controller 140 may determine that the state of the driver is changed from the normal grip state to the hand-off state (S210). Herein, the hand-off determination condition may include a case that the touch sensing value is less than a predetermined first value or a variance of the touch sensing value is within a predetermined first range, and a case that a steering torque sensing value is less than a predetermined fifth value or a variance of the steering torque sensing value is within a predetermined fifth range.

Furthermore, when condition C2 is satisfied in FIG. 14, the controller 140 may determine that the state of the driver is changed from the normal grip state to the abnormal grip state (3230). The more detailed description is given with reference t FIG. 17.

Figure 17:
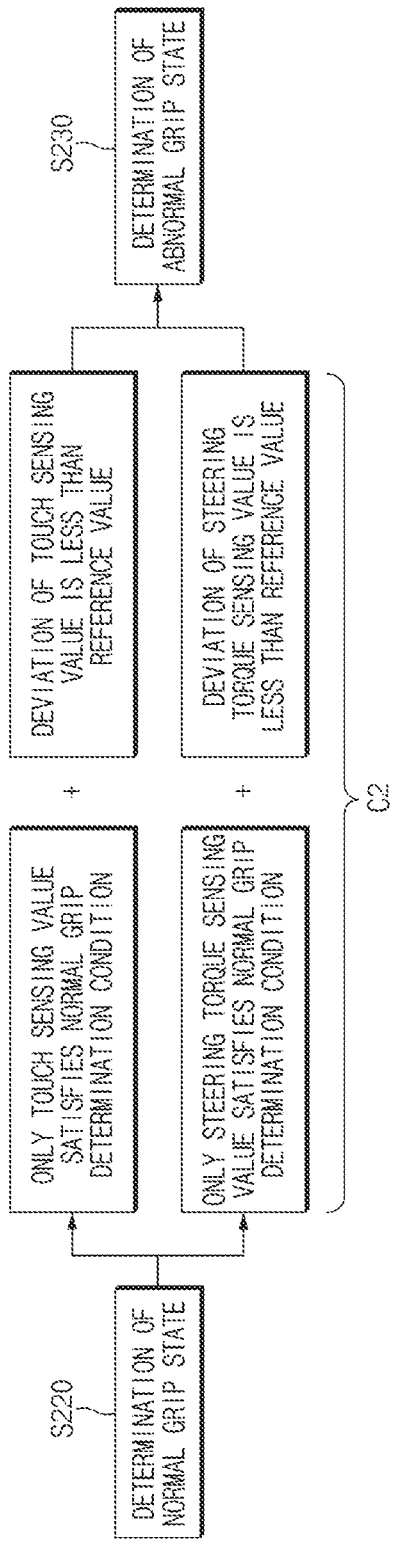
Figure 18:
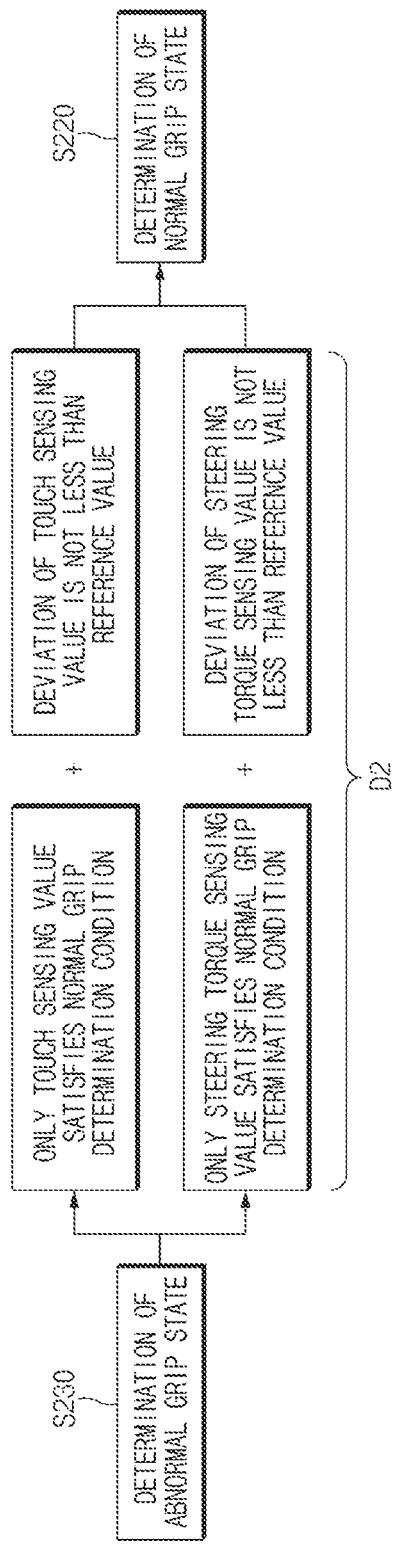

As illustrated in FIG. 17, when the touch sensing value satisfies the normal grip determination condition and a deviation of the touch sensing value is less than the reference value, the controller 140 may determine the state of the driver is changed from the normal grip state to the abnormal grip state (S230). Alternatively, when the steering torque sensing value satisfies the normal grip determination condition and a deviation of the steering torque sensing value is less than the reference value, the controller 140 may determine the state of the driver is changed from the normal grip state to the abnormal state (S230).

Furthermore, when condition D2 is satisfied in FIG. 14, the controller 140 may determine that the state of the driver is changed from the abnormal grip state t the normal grip state (S220). The more detailed description is given with reference to FIG. 18.

As illustrated in FIG. when the touch sensing value satisfies the normal grip determination condition and a deviation of the touch sensing value is not less than the reference value, the controller 140 may determine the state of the driver is changed from the abnormal grip state to the normal grip state (S220). Alternatively, when the steering torque sensing value satisfies the normal grip determination condition and a deviation of the steering torque sensing value is not less than the reference value, the controller 140 may determine the state of the driver is changed from the abnormal grip state to the normal grip state (3220).

When condition E2 is satisfied in FIG. 14, the controller 140 may determine that the state of the driver is changed from the abnormal grip state to the hand-off state (S210). The more detailed description is given with reference to FIG. 19.

Figure 19:
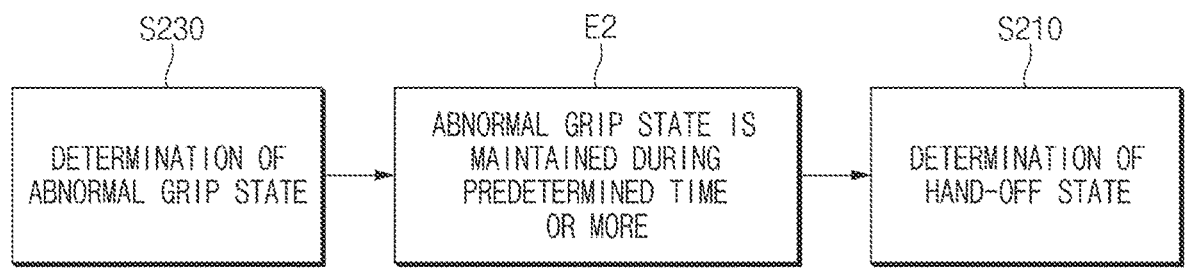

As illustrated in FIG. 19, when determining that the abnormal grip state is maintained in the abnormal grip state during a predetermined time, the controller 140 may determine that the state of the driver is changed from the abnormal grip state to the hand-off state (S210). Herein, the abnormal grip state may include a state where a deviation of the touch sensing value or a deviation of the steering torque sensing value is less than a reference value.

Figure 20:
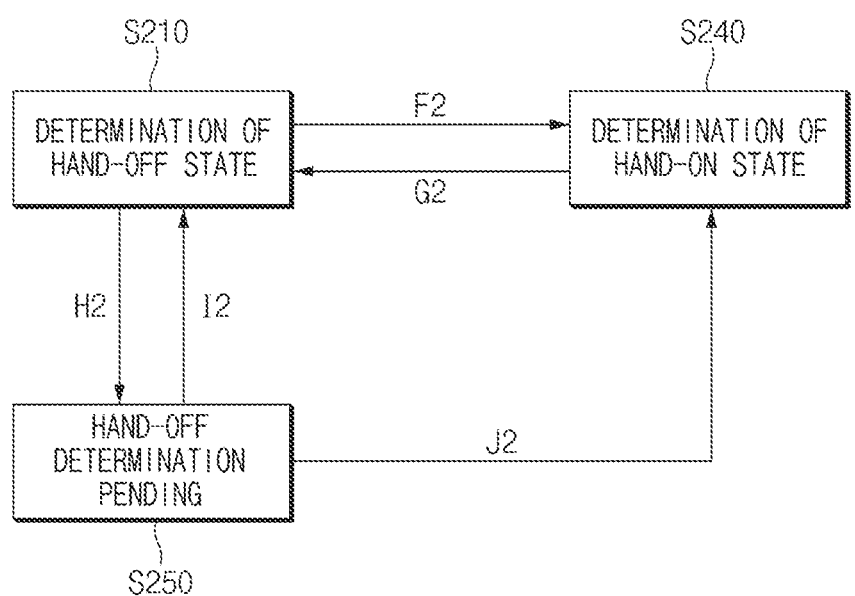
FIGS. 20 to 25 are diagrams illustrating an operation of determining a hand-off state, a hand-off determination pending state, and a hand-on state according to some forms of the present disclosure.

As illustrated in FIG. 20, the controller 140 may determine that the state of the driver is a hand-off state, based on at least one of a touch sensing value or a steering torque sensing value (S210). Besides, on the basis of at least one of a touch sensing value or a steering torque sensing value, the controller 140 may determine that the state of the driver is changed from a hand-oft state to a hand-on state (S240), or may determine that the state of the driver is changed from the hand-off state to a hand-off determination pending state (S250).

When condition F2 is satisfied in the hand-off state in FIG. 20, the controller 140 may determine that the state of the driver is changed from the hand-off state to the hand-on state (S240). The more detailed description is given with reference FIG. 21.

Figure 21:
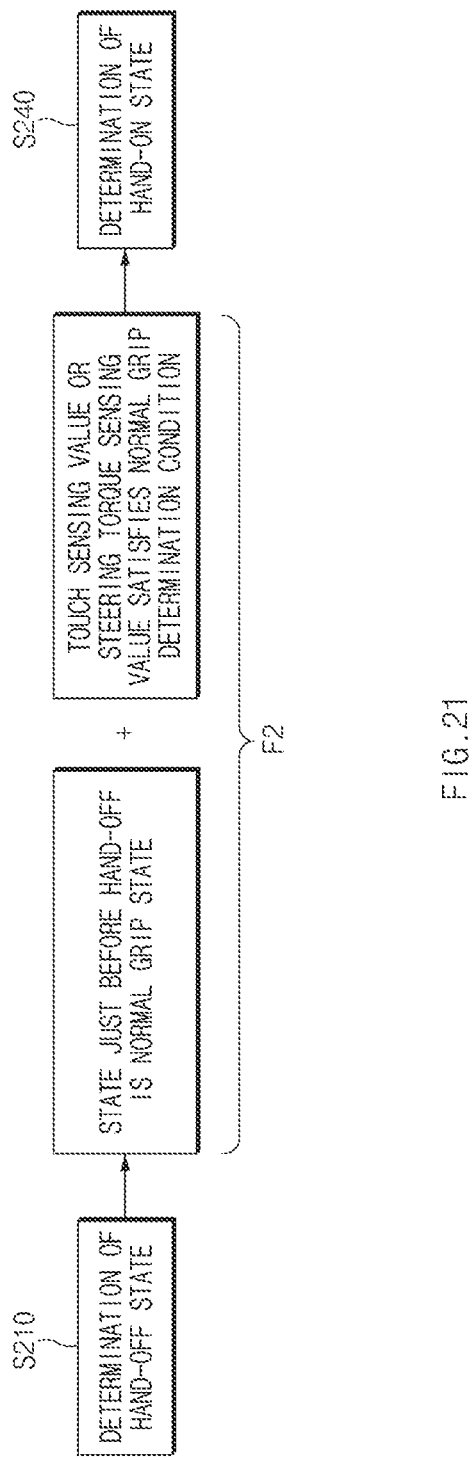

As illustrated in FIG. 21, when a state just before hand-off is a normal grip state and when the touch sensing value or the steering torque sensing value satisfies the normal grip determination condition, the controller 140 may determine that the state of the driver is the hand-on state (S240). The normal grip determination condition may include a case that a touch sensing value is not less than a second value greater than a predetermined first value, or a case that a variance of the touch sensing value is out of a second range greater than a predetermined first range. Furthermore, the normal grip determination condition may include a case that the steering torque sensing value is not less than a sixth value greater than a predetermined fifth value, or a case that a variance of the steering torque sensing value is out of a sixth range greater than predetermined fifth range.

Furthermore, when condition G2 is satisfied in the hand-off state in FIG. 20, the controller 140 may determine that the state of the driver is changed from the hand-on state to the hand-off state (S210). The more detailed description is given with reference to FIG. 22.

Figure 22:
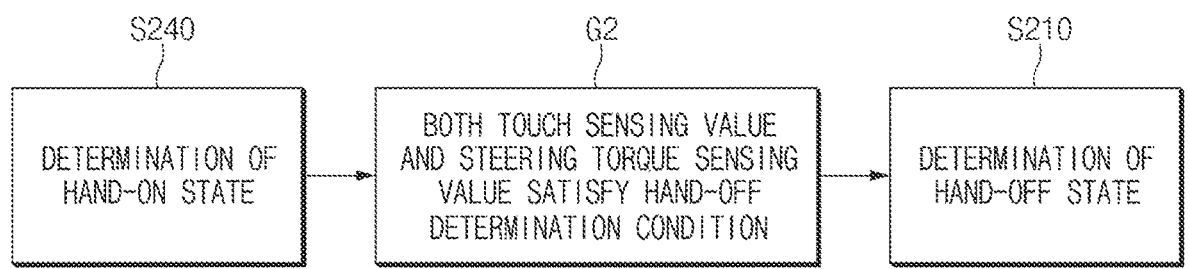

As illustrated in FIG. 22, when both the touch sensing value and the steering torque sensing value satisfy the hand-off determination condition, the controller 140 may determine that the state of the driver is the hand-off state (S210). Herein, the hand-off determination condition may include a case that the touch sensing value is less than a predetermined first value or a variance of the touch sensing value is within a predetermined first range, and a case that a steering torque sensing value is less than a predetermined fifth value or a variance of the steering torque sensing value is within a predetermined fifth range.

Moreover, when condition H2 is satisfied in hand-off state in FIG. 20, the controller 140 may determine that the state of the driver is changed from the hand-off state to the hand-off determination pending state (S250). The more detailed description is given with reference to FIG. 23.

Figure 23:
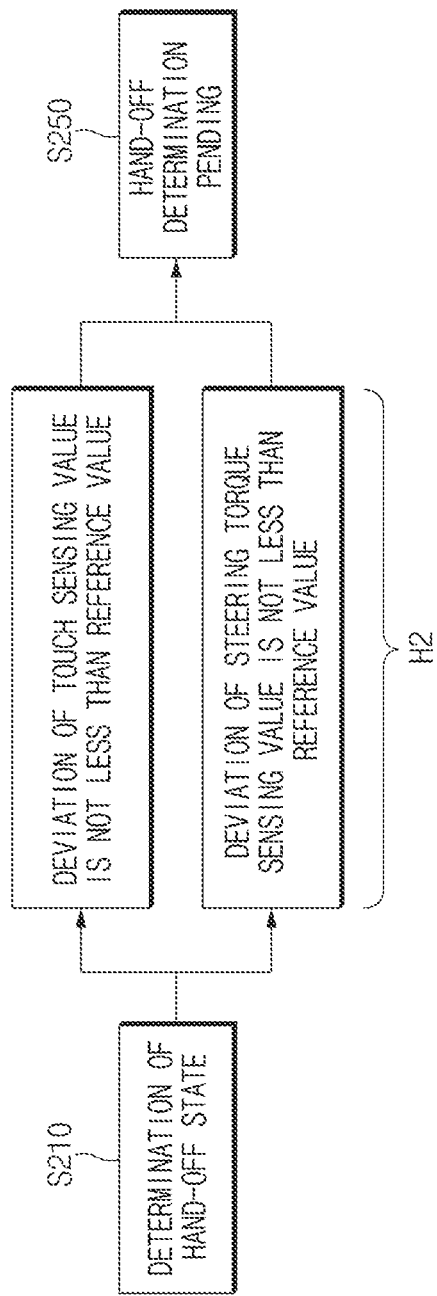

As illustrated in FIG. 23, when a deviation of the touch sensing value in the hand-off state is not less than a reference value, the controller 140 may determine that state of the driver is changed from hand-off state ta the hand-off determination pending state (S250). Alternatively when a deviation of the steer torque sensing value in hand-off state is not less than a reference values, the controller 140 may determine that the state of the driver is the hand-off determination pending state (S250).

Furthermore, when condition. 12 is satisfied in the hand-off determination pending state in FIG. 20, the controller 140 may determine that the state of the driver is changed from the hand-off determination pending state to the hand-off state (3210). The more detailed description is given with reference to FIG. 24.

Figure 24:
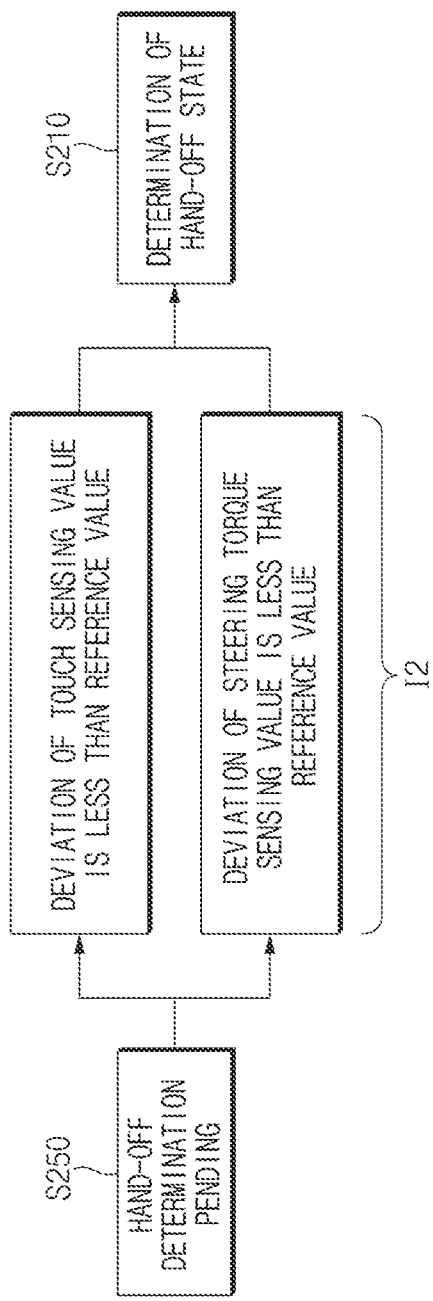

As illustrated in FIG. 24, when a deviation of the touch sensing value in the hand-off determination pending state is less than a reference value, the controller 140 may determine that the state of the driver is changed from the hand-off determination pending state to the hand-off state (3210). Alternatively, when a deviation of the steering torque sensing value in the hand-off determination pending state is less than the reference value, the controller 140 may determine that the state of the driver is the hand-off state (S210).

Furthermore, when condition J2 is satisfied in the hand-off determination pending state in FIG. 20, the controller 140 may determine that the state of the driver is changed from the hand-off determination pending state to the hand-on state (S240). The more derailed description is given with reference to FIG. 25.

Figure 25:
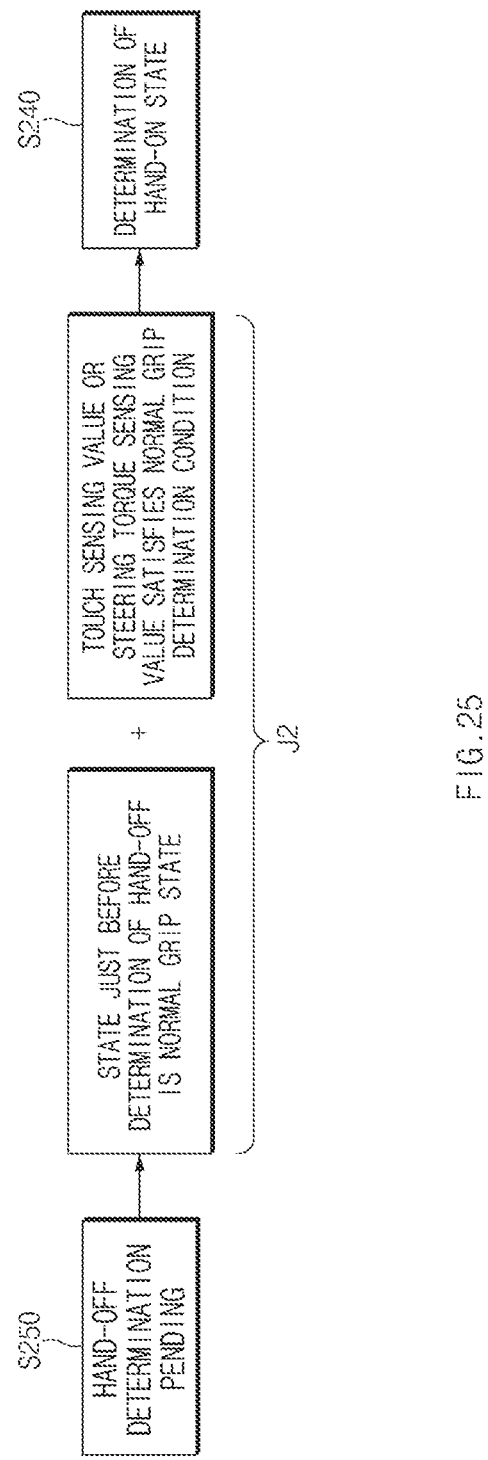

As illustrated in FIG. 25, when a state just before determination of hand-off is a normal grip state and when the touch sensing value or the steering torque sensing value satisfies the normal grip determination condition, the controller 140 may determine that the state of the driver is changed from the hand-off determination pending state to the hand-on state (S240).

When determining that the state of the driver is the hand-off state, the controller 140 may output a guide message (a hand-off message) for hand-off. According to another form of the present disclosure, when a predetermined time elapses after the hand-off state is determined, the controller 140 may output a hand-off message for the hand-off. For example, the hand-off message may include the content of "hold a steering wheel". Also, the controller 140 may differently set a start point, at which a hand-off message is output by determining that the state of the driver is changed from an abnormal grip state to a hand-off state, and a start point at which the hand-off message is output by determining that the state of the driver is changed from the normal grip state to the hand-off state. According to an exemplary form, the controller 140 may set a start point, at which the hand-off message is output by determining that the state of the driver is changed from the abnormal grip state to the hand-off state, to be faster than a start point at which the hand-off message is output by determining that the state of the driver is changed from the normal grip state to the hand-off state.

According to another form of the present disclosure, when determining that the state of the driver is changed from the abnormal grip state to the hand-off state, the controller 140 may output a hand-off message in the abnormal grip state. For example, the hand-off message may include the content of "hold a steering wheel a little harder".

Moreover, the controller 140 may differently set a sound of a hand-off message output in the hand-off state and a sound of the hand-off message output in the abnormal grip state.

When determining that the state of the driver is the normal grip state, the controller 140 may allow driving, control to the driver. Besides, when determining that the state of the driver is changed from the abnormal grip state to the hand-off state, the controller 140 may output a hand-off message (hold a steering wheel a little harder). When there is the driver's action corresponding to the hand-off message, the controller 140 may allow driving control to the driver. Furthermore, when determining that the state of the driver is changed from the normal grip state to the hand-off state, the controller 140 may output a hand-off message (held a steering wheel). When there is the driver's action corresponding to the hand-off message, the controller 140 may allow driving control to the driver.

Figure 26:
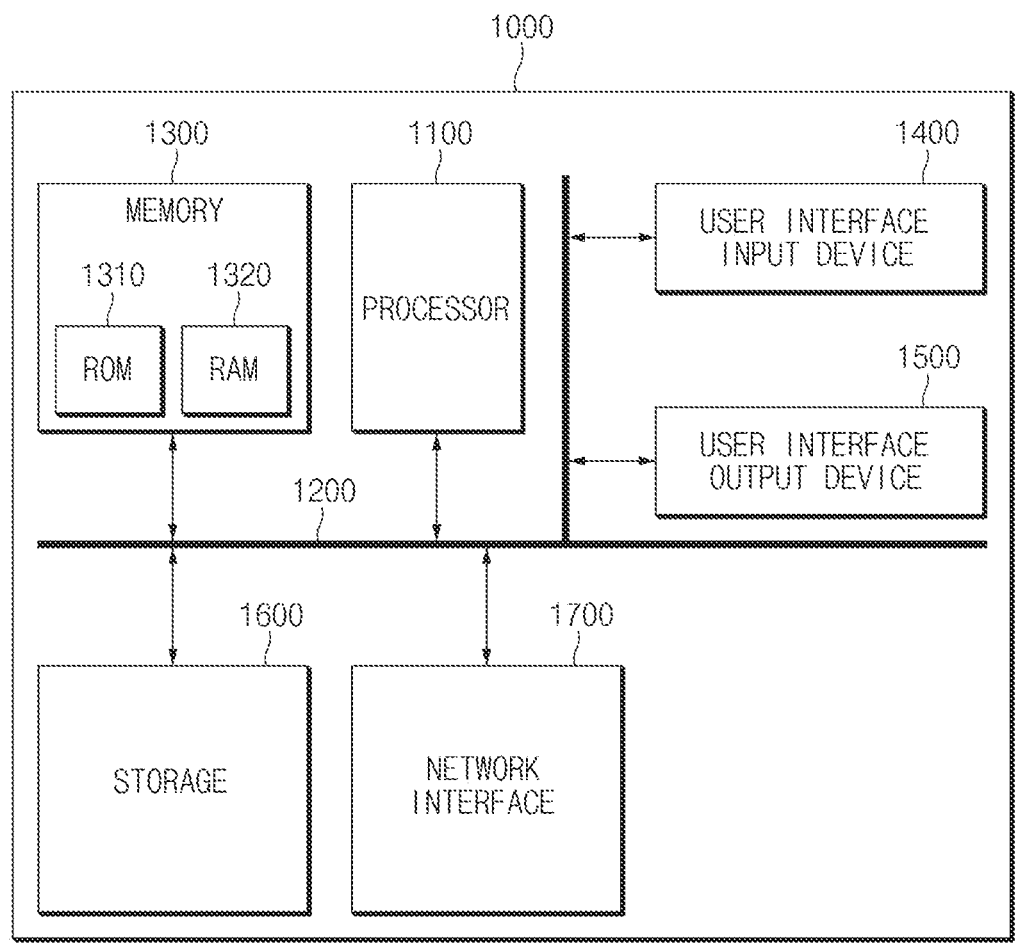
FIG. 26 is a block diagram illustrating a configuration of a computing system performing a method, according to an exemplary form of the present disclosure.

FIG. 26 is a block diagram illustrating a configuration or a computing system performing method, according to another exemplary form of the present disclosure.

Referring to FIG. 26, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (RCM) 1310 and a random access memory (RAM) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a RPM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

According to some forms of the present disclosure, when it is difficult for a driver to receive a driving control right during autonomous driving, a driver state determination apparatus may prevent the driving control right from being transferred to the driver by inhibiting the driver from causing a vehicle to incorrectly determine that the driver's hand(s) is positioned on a steering wheel.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A driver state determining method, the method comprising:
    obtaining, by at least one sensor, a touch sensing value corresponding to a touch input by a driver of a vehicle, and a steering torque sensing value corresponding to a steering torque input from the driver; and
    determining a state of the driver as one of a hand-off state, a normal grip state, an abnormal grip state, or a hand-off determination pending state based on at least one of the touch sensing value or the steering torque sensing value,
    wherein the determining of the state of the driver includes:
    determining that the state of the driver is changed from the hand-off state to the normal grip state when a state before determination of the hand-off state is the abnormal grip state based on the touch sensing value, a normal grip determination condition based on the touch sensing value or the steering torque sensing value is satisfied, and a deviation of the touch sensing value is different from the deviation of the touch sensing value in the abnormal grip state by a predetermined value or more.

2. The method of claim 1, wherein the determining of the state of the driver includes:
    determining the state of the driver as the hand-off state when the touch sensing value is less than a predetermined value or when a variance of the touch sensing value is within a predetermined range.

3. The method of claim 1, wherein the determining of the state of the driver includes:
    determining that the state of the driver is changed from the hand-off state to the normal grip state when a state before determination of the hand-off state is the abnormal grip state, a normal grip determination condition is satisfied, and a deviation of the touch sensing value is different from the deviation of the touch sensing value in the abnormal grip state by a predetermined value or more.

4. The method of claim 3, wherein the normal grip determination condition includes:
    a case that the touch sensing value is not less than a predetermined value or variance of the touch sensing value is out of a predetermined range.

5. The method of claim 4, wherein the determining of the state of the driver includes:
    determining that the state of the driver is changed from the normal grip state to the abnormal grip state when the deviation of the touch sensing value in the normal grip state is less than a reference value.

6. The method of claim 1, wherein the determining of the state of the driver includes:
    determining the state of the driver as the hand-off determination pending, state when a deviation of the touch sensing value in the hand-off state is not less than a reference value.

7. The method of claim 1, wherein the determining of the state of the driver includes:
    determining the state of the driver as the hand-off state when each of the touch sensing value and the steering torque sensing value are less than a predetermined value or both a variance of the touch sensing value and a variance of the steering torque sensing value are within a predetermined range.

8. The method of claim 1, wherein the determining of the state of the driver includes:
    determining that the state of the driver is changed from the hand-off state to the normal grip state when the state before determination of the hand-off state is the abnormal grip state based on the steering torque sensing value, the normal grip determination condition based on the touch sensing value or the steering torque sensing value is satisfied, and a deviation of the steering torque sensing value is not less than a reference value.

9. The method of claim 8, wherein the normal grip determination condition based on the touch sensing value or the steering torque sensing value includes:
    a case that the touch sensing value or the steering torque sensing value is not less than a predetermined value or a variance of the touch sensing value or a variance of the steering torque sensing value is out of a predetermined range.

10. The method of claim 9, wherein the determining of the state of the driver includes:
    determining that the state of the driver is changed from the normal grip state to the abnormal grip state when a deviation of the touch sensing value is less than a reference value in the normal grip state based on the touch sensing value or the steering torque sensing value is less than a reference value in the normal grip state based on the steering torque sensing value.

11. The method of claim 1, wherein the determining of the state of the driver includes:
    determining the state of the driver as the hand-off determination pending state when a deviation of the touch sensing value or a deviation of the steering torque sensing value is not less than a reference value in the hand-off state.

12. The method of claim 1, further comprising:
    outputting a guide message based on the determined state of the driver.

13. The method of claim 12, wherein the outputting of the guide message includes:
    outputting a hand-off message when at least one of the hand-off state or the abnormal grip state is determined as the state of the driver.

14. The method of claim 13, wherein the outputting of the guide message includes:
    differently setting an output start point of the hand-off message when it is determined that the state of the driver is changed from the normal grip state to the hand-off state and an output start point of the hand-off message when it is determined that the state of the driver is changed from the abnormal grip state to the hand-off state.

15. The method of claim 13, wherein the outputting of the guide message includes:
    outputting different hand-off messages based on whether the state of the driver is changed from the normal grip state to the hand-off state and whether the state of the driver is changed from the abnormal grip state to the hand-off state.

16. The method of claim 13, wherein e outputting of the guide message includes:
    differently setting a sound of the hand-off message in the hand-off state and a sound of the hand-off message in the abnormal grip state.

17. A driver state determination apparatus, comprising:
    a touch sensor configured to detect a touch input by a driver of a vehicle and generate a touch sensing value corresponding to the touch input;

a steering torque sensor configured to measure a steering torque input from the driver and generate a steering torque sensing value corresponding to the measured steering torque; and a controller configured to determine a state of the driver as at least one of a hand off state, a normal grip state, an abnormal grip state, or a hand off determination pending state based on at least one of the touch sensing value or the steering torque sensing value, wherein the controller is further configured to determine that the state of the driver is changed from the hand-off state to the normal grip state when a state before determination of the hand-off state is the abnormal grip state based on the touch sensing value, a normal grip determination condition based on the touch sensing value or the steering torque sensing value is satisfied, and a deviation of the touch sensing value is different from the deviation of the touch sensing value in the abnormal grip state by a predetermined value or more.

18. The driver state determination apparatus of claim 17, wherein the touch sensor includes at least one of an electrostatic sensor or a pressure-sensitive sensor.

19. The driver state determination apparatus of claim 17, further comprising an output device configured to output a guide message based on the determined state of the driver.

* * * * *